US012779979B2

(12) United States Patent
Yilmaz

(10) Patent No.: US 12,779,979 B2
(45) Date of Patent: Nov. 3, 2026

(54) COOLING FAN MODULE FOR A MOTOR VEHICLE

(71) Applicant: Robert Bosch GmbH, Stuttgart (DE)

(72) Inventor: Fatih Yilmaz, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 259 days.

(21) Appl. No.: 18/715,191

(22) PCT Filed: Dec. 16, 2022

(86) PCT No.: PCT/EP2022/086325

§ 371 (c)(1),
(2) Date: May 31, 2024

(87) PCT Pub. No.: WO2023/111257

PCT Pub. Date: Jun. 22, 2023

(65) Prior Publication Data

US 2025/0026192 A1 Jan. 23, 2025

(30) Foreign Application Priority Data

Dec. 17, 2021 (DE) .................... 10 2021 214 620.1

(51) Int. Cl.
*B60K 11/06* (2006.01)

(52) U.S. Cl.
CPC .................................... *B60K 11/06* (2013.01)

(58) Field of Classification Search
CPC .......... B60K 11/00; B60K 11/06; F16F 15/04; F16F 1/371; F01P 5/02; F01P 5/04; F01P 5/06; F01P 11/10; B60R 11/00; B60R 2011/0059; B60R 2011/0071
See application file for complete search history.

(56) References Cited

U.S. PATENT DOCUMENTS

| | | | | |
|---|---|---|---|---|
| 6,016,774 | A | 1/2000 | Bokkers et al. | |
| 2008/0302622 | A1* | 12/2008 | Ohtake .................. | F16F 1/371 188/379 |
| 2014/0299735 | A1 | 10/2014 | Hein et al. | |

FOREIGN PATENT DOCUMENTS

| | | | |
|---|---|---|---|
| DE | 1349831 | U | 7/1935 |
| DE | 69301597 | T2 | 9/1996 |
| DE | 69620912 | T2 | 11/2002 |
| DE | 102007015013 | A1 | 10/2007 |
| DE | 102011085558 | A1 | 5/2013 |
| DE | 102014208395 | A1 | 11/2015 |

(Continued)

OTHER PUBLICATIONS

FR 2965297 translation (Year: 2012).*

(Continued)

*Primary Examiner* — Timothy Hannon
(74) *Attorney, Agent, or Firm* — Michael Best & Friedrich LLP

(57) ABSTRACT

The invention is based on a cooling fan module (10) for a vehicle, having a cooler shroud (12) and an assembly module (100) fastened to the cooler shroud (10), having an elastic assembly holder (101) and an assembly (102) accommodated in the assembly holder (101), the assembly holder (101) having an internal receptacle (104) surrounding the assembly (102). It is proposed that the cooler shroud (12) has an expanding element (15, 15*a*, 15*b*) which is designed to expand the internal receptacle (104) of the assembly holder (101).

20 Claims, 3 Drawing Sheets

(56) References Cited

FOREIGN PATENT DOCUMENTS

| | | | |
|---|---|---|---|
| DE | 102014224978 | A1 | 6/2016 |
| DE | 102016201560 | A1 | 8/2017 |
| EP | 3870859 | B1 | 4/2023 |
| FR | 2965297 | A1 | 3/2012 |
| WO | 2020083495 | A1 | 4/2020 |

OTHER PUBLICATIONS

DE 102014208395 translation (Year: 2015).*
Translation of International Search Report for Application No. PCT/EP2022/086325 dated Mar. 31, 2023 (3 pages).

* cited by examiner

COOLING FAN MODULE FOR A MOTOR VEHICLE

BACKGROUND

The invention is based on a cooling fan module belonging to the class of patent specified in the disclosure.

Assembly holders are already known from the prior art. As a rule these are fastened to body components. To provide a sufficiently stable connection, such assembly holders have stiffening elements, for example additional metal mounting components, in the region connecting to the body.

SUMMARY

The invention relates to a cooling fan module for a vehicle, having a cooler shroud and an assembly module fastened to the cooler shroud, having an elastic assembly holder and an assembly accommodated in the assembly holder, wherein the assembly holder has an internal receptacle enclosing the assembly.

It is proposed that the cooler shroud has an expanding element which is designed to expand the internal receptacle of the assembly holder.

The cooling fan module according to the invention has the advantage that the assembly can be mounted in the vehicle in a particularly cost-optimized and space-saving manner. At the same time, owing to the radial gap formed between the assembly holder and the assembly, oscillations and vibrations between the assembly and the cooler shroud can be advantageously reduced so that noise transmission can be reduced.

An assembly of the type discussed here can in particular be a pump, particularly preferably a cooling circuit pump. The assembly holder is preferably configured to receive the assembly. Preferably, the assembly is inserted into the assembly holder. Particularly preferably, the assembly holder encloses the assembly. According to a preferred further development of the invention, the assembly holder lies flat against the surface shell of the assembly outside of the expanding segments.

For example, a cooling fan module of the type discussed here can be used to cool engine components in a vehicle. Such a cooling fan module typically has, in addition to the cooler shroud, a fan which is suspended in the cooler shroud.

In the context of the present invention, an expanding element can be understood to be a means suitable for transferring such a large expanding force to the assembly holder that the assembly holder locally detaches from the assembly and at the same time sufficient surface pressure for fastening can be provided on the assembly outside the expanding segments. In the context of the present invention, a pure expanding element can particularly be understood to be a guide element, which is configured so as to transfer this expanding force to the assembly holder. Preferably, the expanding element is configured as a connection from an oblique engagement of a guide element and a latching element.

According to an advantageous further development of the invention, the expanding element expands the assembly holder in an expanding segment such that a radial gap is formed between the internal receptacle of the assembly holder and the assembly. Preferably, the radial gap has a size of at least 0.2 mm. Preferably, the internal receptacle of the assembly holder and the assembly, in particular a surface shell of the assembly, are spaced apart from each other in the expanding segment.

According to an advantageous further development of the invention, the cooler shroud has a first guide element and a second guide element spaced apart from the first guide element. Preferably, the guide elements in each case interact in a positive manner with a corresponding fastening element of the assembly holder. Particularly preferably, the guide element engages the fastening element in a positive manner. Particularly preferably, the guide element can be inserted into the fastening element. Preferably, each guide element has an expanding element segment. Preferably, the expanding element segments are configured to deform the internal receptacle in a corresponding expanding segment.

In the context of the present invention, a fastening element is to be understood as an element configured to form a pair of active surfaces with the guide element when the assembly holder is installed on the cooler shroud, accordingly restricting the degree of freedom of the assembly holder. The guide element is thus configured to form a direct pair of active surfaces with the fastening element due to the shape thereof. Preferably, the guide element is accommodated by the fastening element. Such a positive connection allows for a simple insertion or introduction of the assembly holder. Assembly and disassembly of the assembly are thus significantly simplified. Preferably, the guide elements are in each case arranged spaced apart from each other on the cooler shroud.

Preferably, the guide elements are spaced apart from each other such that the assembly can be arranged between the guide elements. The distance between the guide elements is thus preferably greater than the assembly diameter. Preferably, the cooling fan module has exactly two guide elements. The elastic assembly holder can thus be particularly advantageously suspended between the guide elements and does not require any additional stiffening elements, for example any metal mounts. The assembly process of the assembly holder in the vehicle can thus be advantageously reduced by at least one method step, assembling the stiffening element. It is conceivable that very different, customer-specific assembly holders can correspond to a predefined design of the guide elements, so that assemblies of very different power classes can be accommodated on the cooler shroud.

According to an advantageous further development of the invention, the internal receptacle of the assembly holder lies substantially entirely outside of the expanding segments in the mounted state, in particular contacting flat against the surface of the assembly.

An advantageous further development of the invention provides that the internal receptacle has a substantially cylindrical contour prior to assembly on the guide elements of the cooler shroud, wherein the expanding element segments are configured to draw the internal receptacle radially outward from the cylindrical contour in the respective expanding segment. Preferably, this is done via a combination of the expanding angle and the expanding hooks. Preferably, the expanding element segments are configured so that in each case a first expanding force and a second expanding force apply on the assembly holder, wherein the expanding force vectors of the expanding forces are preferably aligned substantially opposite to each other.

An advantageous further development of the invention provides that the fastening elements of the assembly holder are arranged on a radial outer side of the assembly holder, in particular substantially diametrically opposite each other.

Preferably, the expanding segments in each case cover a circumferential angle of the substantially cylindrical internal receptacle of between 35° and 85°, in particular of between 50° and 70°, particularly preferably of substantially 60°. In the remaining region of the circumference, the internal receptacle preferably contacts the assembly. In this way, it can be ensured that both the noise attenuation and the mounting function are provided.

Preferably, the radius of the expanding segments in the assembled state deviates from the radius of the internal receptacle in the unassembled state. Preferably, the internal receptacle has a non-circular, in particular a substantially oval contour, after assembly on the guide elements of the cooler shroud, due to the protrusion of the expanding segments.

According to a particularly inexpensive and easy to assemble embodiment of the invention, the expanding element segments have expanding hooks, which are configured so as to transfer the expanding force to the assembly holder. It is also conceivable that the expanding element segments are configured as expanding hooks, in particular as latching hooks, wherein the fastening elements in particular in each case have a receptacle for the expanding hooks. A particularly stable connection can preferably be provided in that the receptacle is configured as a stop surface in the respective fastening element.

A particularly stable, easy-to-manufacture device can preferably be provided in that by the assembly holder having the fastening elements is integrally formed and/or the guide elements and the respective expanding element segment are integrally formed.

Preferably, the radial gap, i.e. the radial distance between the assembly and the internal receptacle of the assembly holder of the respective expanding segment, becomes smaller with increasing distance from the force application point of the expanding element segment on the assembly holder. According to an advantageous further development of the invention, the expanding segment is substantially crescent-shaped.

An advantageous further development of the invention provides that the guide elements are arranged inclined towards the assembly on the cooler shroud, in particular at an expanding angle of between 1° and 20°, preferably between 2° and 15°, in particular preferably between 3° and 10° to the normal of the cooler shroud surface. The expanding angle allows the assembly holder to be particularly easily expanded during insertion. Preferably, the guide elements are integrally formed on the cooler shroud.

According to a particularly preferred further development of the invention, the assembly holder is formed integrally from an elastomer. Preferably, the assembly holder is made of an elastomer, in particular an elastomer.

An advantageous further development of the invention further provides that the guide elements are arranged in a radially outer edge region of the cooler shroud.

BRIEF DESCRIPTION OF THE DRAWINGS

In the drawings, embodiment examples of the cooling fan module and the assembly holder are depicted/shown and explained in more detail in the following description. Shown are.

DETAILED DESCRIPTION

Figure 1:
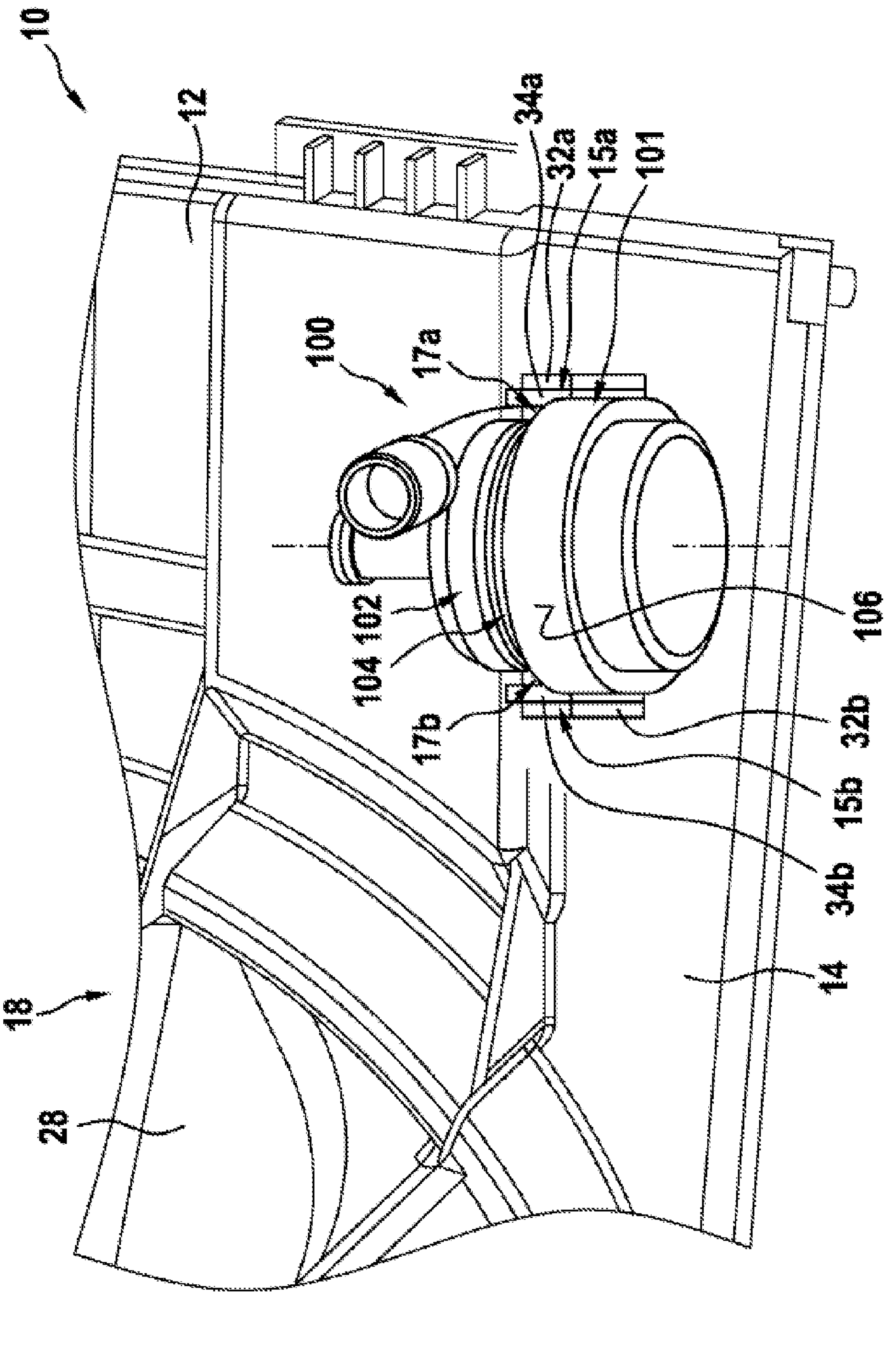
FIG. 1 a section of a perspective view of a cooling fan module having a mounted assembly, FIG. 2 a section of a perspective view of a cooling fan module depicted without an assembly for greater clarity, FIG. 3*a* an assembly holder prior to assembly on a cooler shroud, FIG. 3*b* an assembly holder after assembly on a cooler shroud.

FIG. 1 shows a perspective view of a cooling fan module 10. Such a cooling fan module 10 is, for example, attached to the radiator of the motor vehicle and preferably substantially covers the air passage surface of the radiator. Usually, the cooling fan module 10 is arranged on the rear side of the radiator when viewed in the direction of airflow, but can also be arranged in other instances in the direction of airflow upstream of the air inlet surface of the radiator.

The cooling fan module 10 has a cooler shroud 12, preferably provided with corresponding fastening elements for securing the same and thus the cooling fan module to a radiator or the body of a vehicle. The cooler shroud 12 preferably has a substantially closed shroud cover 14. Preferably, the cooler shroud 12 further has a substantially circular fan opening 18. Preferably, the shroud cover 14 covers the area of the cooler shroud 12 outside the fan opening 18 against air passage, such that air passing through the air through surface of a radiator passes substantially, preferably entirely through the fan opening 18 and thus through a blower wheel 26. Preferably, the cooler shroud 12 has struts that serve to support a fan motor (not shown here), in particular to support an electric motor in the opening 18 of the shroud. A fan or blower wheel, which has fan blades, which are preferably centrally connected to each other via a fan hub, is preferably operationally connected to the electric motor.

The cooler shroud 12 preferably is made essentially of plastic and can be produced in an injection molding process, for example. An assembly module 100 having an elastic assembly holder 101 with an assembly 102 accommodated in the assembly holder 101 is present on the cooler shroud 12, in particular on the shroud cover 14. The assembly 102 can in particular be a pump, particularly preferably a cooling circuit pump. The assembly holder 101 is preferably formed as an elastomeric holder and preferably is made entirely of an elastomer.

FIG. 1 shows one embodiment according to which the assembly 102 is formed as a pump. The pump 102 is arranged and mounted in an assembly holder 101. The assembly holder 101 has a first fastening element 32*a* and a second fastening element 32*b* for the purpose of fastening the assembly to the cooler shroud 12. The fastening elements 32*a*, 32*b* in each case interact with a guide element 34*a*, 34*b* of the cooler shroud 12. Preferably, the guide elements 34*a*, 34*b* each engage with the fastening element 32*a*, 32*b* in a positive manner.

For example, the pump 102 has a pump pressure header here. The pump pressure header is to be installed in a specific angular position relative to the cooler shroud 12 depending on a corresponding connection point of the vehicle. The pump 102 is used as an example of an assembly of a vehicle.

As can be clearly seen in FIG. 1, the guide elements 34*a*, 34*b* of the cooler shroud 12 are arranged spaced apart from each other. The assembly holder 101 is suspended via the fastening elements 32*a*, 32*b* between the guide elements 34*a*, 34*b* and thus clamped on two sides. Due to the two-sided clamping, additional stabilizing elements, for example stiffening elements in the elastomer mount or additional fastening elements made of a dimensionally stable material, can be eliminated. Preferably, the guide elements 32 are arranged in a radially outer edge region of the cooler shroud 12. Preferably, the guide elements are arranged as far away from the fan hub as possible on the cooler shroud 12. Preferably, the guide elements 32*a*, 32*b* are arranged in a connection region of the cooler shroud 12 on the motor vehicle.

According to the embodiment of the invention shown in FIG. 1, the guide elements 34*a*, 34*b* are spaced apart from each other further than the width of the assembly 102 in the connecting region, so that the assembly 102 can be centrally clamped between the guide elements. The assembly holder has an internal receptacle 104. The internal receptacle 104 is preferably arranged opposite the radially outer surface 106. The internal receptacle 15 is preferably that inner surface of the assembly holder 101 which faces toward the assembly 102. The internal receptacle 104 preferably contacts the assembly 102 over a substantial circumferential range of the assembly 102.

The cooler shroud 12 now has an expanding element 15, which is formed to expand the internal receptacle 104 of the assembly holder 101. The expanding element 15 preferably expands the assembly holder 101 in an expanding segment, such that a radial gap is formed between the internal receptacle 104 of the assembly holder 101 and the assembly 102. In other words, in the expanding segment 17*a*, 17*b*, the internal receptacle is drawn away from the assembly 102 such that the internal receptacle 104 no longer contacts the outer surface shell of the assembly 102 in this segment. This radial gap can be particularly advantageous for damping oscillations and vibrations between the assembly and the cooler shroud and thus act as a damping and noise decoupling element.

Figure 2:
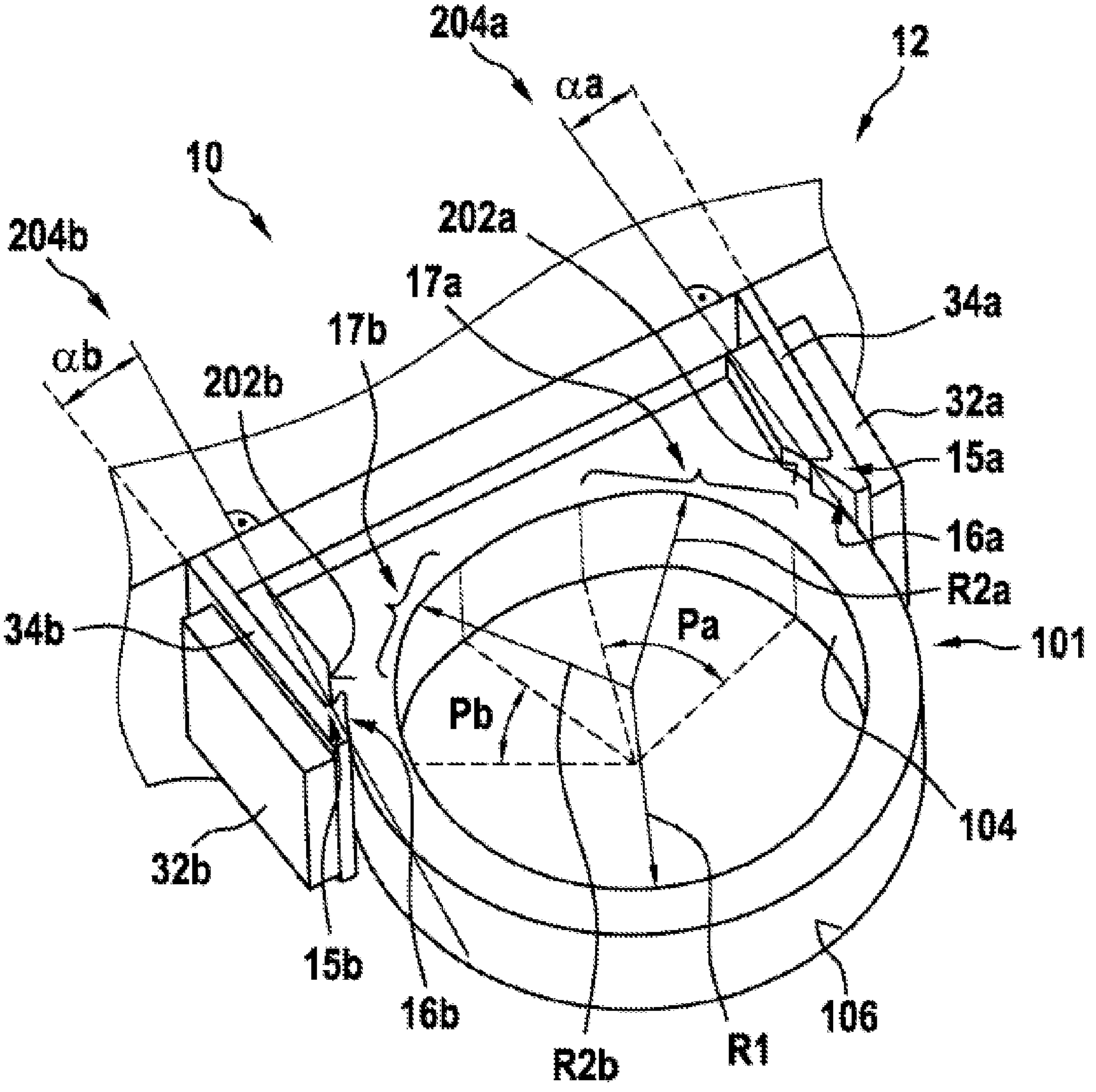

FIG. 2 shows a perspective view of the assembly holder 101 in a position installed on the cooler shroud 12. For clearer visibility of the expanding element segments 15*a*, 15*b*, as well as the expanding segments 17*a*, 17*b*, the assembly 102 is not shown in FIG. 2. The cooler shroud 12 preferably has a first guide element 34*a* and a second guide element 34*b*. The guide elements 23*a*, 34*b* preferably protrude over the contour of the top surface 14 of the cooler shroud 12. In the mounted state, the assembly 102 is centrally arranged between the guide elements 34*a*, 34*b*. For fastening the assembly holder 101 to the cooler shroud 12, it is now provided that in each case a fastening element 32*a*, 32*b* interacts with a corresponding guide element 34*a*, 34*b*.

Preferably, the guide elements 34*a*, 34*b* extend over the contour of the cooler shroud plane. The guide elements 34*a*, 34*b* are preferably formed as protrusions. Preferably, each guide element 34*a*, 34*b* has an insertion slot 200*a*, 200*b*. Preferably, the guide elements 34*a*, 34*b* are formed as substantially thin-walled protrusions. The insertion slot 200*a*, 200*b* is preferably formed open on one side so that the corresponding fastening element 32*a*, 32*b* can be inserted from the opening side.

According to an advantageous further development of the invention, the guide elements 34*a*, 34*b* are in each case arranged inclined towards the assembly 102 on the cooler shroud 12. According to the embodiment of the invention shown in FIG. 2, the guide elements are in each case arranged at an expanding angle α between 1° and 20°, preferably between 2° and 15°, preferably between 3° and 10° to the normal of the radiator shroud surface 204*a*, 204*b*. According to an advantageous further development of the invention, the insertion slots 200*a*, 200*b* have the same expanding angle α. Due to the expanding angle α, the assembly holder 102 is drawn locally radially outward during clamping so that the corresponding expanding segments 17*a*, 17*b* are formed.

According to the embodiment of the invention shown in FIG. 2, the guide elements 34*a*, 34*b* in each case have an expanding element segment 15*a*, 15*b* of the expanding element 15. The expanding element segments 15*a*, 14*b* are preferably in each case formed as expanding tabs or latching tabs. By inserting the guide element 34*a*, 34*b* between the expanding lug and a correlating receptacle 201*a*, 201*b* formed on the fastening element 322*a*, 32*b* at the expanding angle α to the pair of active surfaces, the internal receptacle 104 can be locally detached from the assembly such that a radial gap emerges in the corresponding expanding segment 17*a*, 17*b*, between the internal receptacle 104 of the assembly mount and the minimally distant surface shell of the assembly 102. This expanding segment 17*a*, 17*b* significantly affects the damping and decoupling behavior. In other words, the expanding element 15 is capable of detaching the internal receptacle 104 from the assembly locally over a relatively small circumference without negatively affecting the mounting function between the assembly holder and the assembly.

The guide elements 34*a*, 34*b* are preferably formed integrally with the cooler shroud 12. Preferably, the connecting elements 35*a*, 35*b* are molded onto the shroud cover 14 in an injection molding process.

According to an advantageous further development of the invention, the surface shell of the assembly 102 and the internal receptacle 104 are formed spaced apart from each other in the expanding segment 17*a*, 17*b* of the internal receptacle 104. Preferably, this distance is between 0.5 and a few millimeters. The internal receptacle 104 of the assembly holder 101 is deformed by the respective expanding element segments 15*a*, 15*b* in a first expanding segment 17*a* and a second expanding segment 17*b*, in particular elastically deformed. Outside of the expanding segments 17*a*, 17*b*, the internal receptacle contacts the outer surface shell of the assembly 102.

Preferably, the first expanding element segment 15*a* and the second expanding element segment 15*b* in each case exert a first expanding force F1 and a second expanding force F2 on the assembly holder 101. Preferably, the expanding force vectors of the expanding forces F1, F2 are aligned substantially opposite to each other. As can be seen in FIG. 2, according to an advantageous further development, the fastening elements 32*a*, 32*b* are respectively arranged on an outer surface 106 of the assembly holder. Preferably, the fastening elements 32*a*, 32*b* are substantially opposite each other. Preferably, the assembly holder 101 having the fastening elements 32*a*, 32*b* is integrally formed.

According to an advantageous further development of the invention, the expanding segments 17*a*, 17*b* in each case cover a circumferential angle φa, φb of between 35° and 85°, in particular of between 50° and 70°, particularly preferably of substantially 60° of the internal receptacle 104. In this way, a sufficiently great damping effect can be provided while securing the fastening of the assembly in the assembly holder. By drawing the assembly holder apart by means of the expanding element 15, the internal receptacle of the assembly holder 101 in the assembled state has a non-circular contour. Preferably, the contour is formed oval in segments. According to an advantageous further development of the invention, the radius R2*a*, R2*b* of the expanding segments 17*a*, 17*b* in the assembled state deviates from the radius R1 of the internal receptacle 104 to the center point.

Figure 3A:
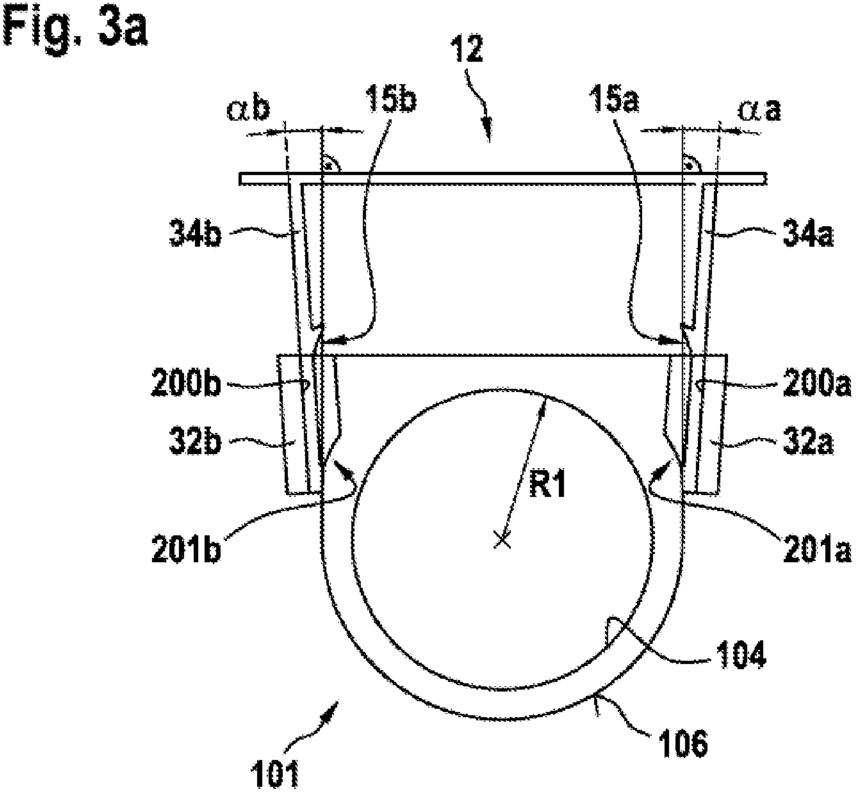
Figure 3B:
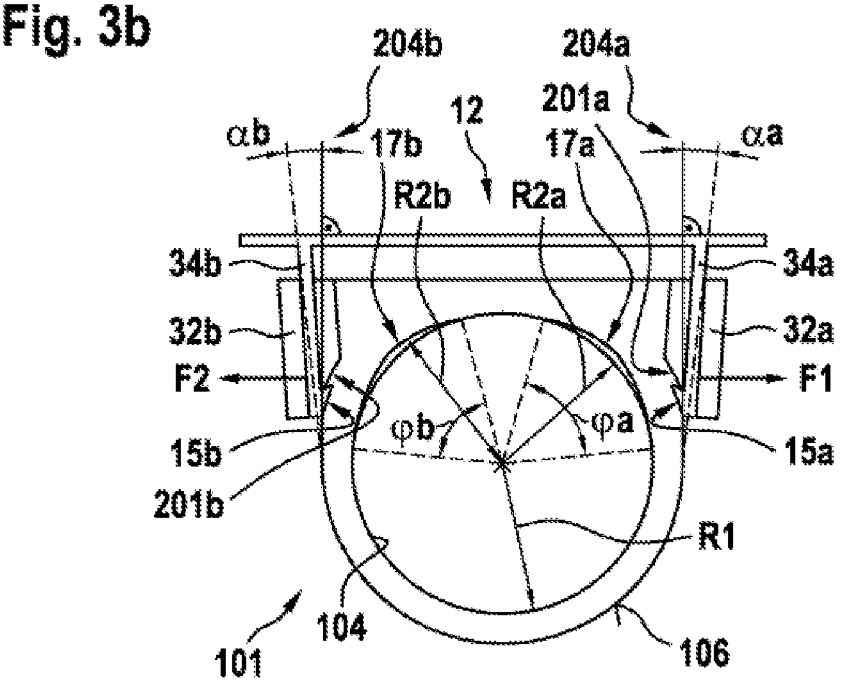

FIG. 3*a* shows an assembly holder 101 prior to assembly on the cooler shroud 12, FIG. 3*b* after assembly. Prior to assembly, the internal receptacle 104 is cylindrical and preferably has an inner radius R1. The fastening elements 32*a*, 32*b* are arranged on the radially outer side of the assembly holder 191. Each fastening element 32*a*, 32*b* preferably has an insertion slot 200*a*, 200*b* into which the guide element 34*a*, 34*b* arranged on the cooler shroud 12 is inserted. The guide elements 34*a*, 34*b* extend over the contour of the cooler shroud plane. As can be clearly seen in FIG. 3*a*, the guide elements 34*a*, 34*b* have an expanding angle αa, αb to the normal of the radiator shroud surface 204*a*, 204*b*. Preferably, the two angles αa, αb are substantially the same size. Preferably, the expanding angle is between 1° and 20°, preferably between 2° and 15°, particularly preferably between 3° and 10°. When inserting the guide element 34*a*, 34*b* into the corresponding angular insertion slot 200*a*, 200*b*, the assembly holder is drawn radially outward in the region of the fastening element 32*a*, 32*b* such that the expanding segments 17*a*, 17*b* arise, between which the internal receptacle 104 no longer contacts the assembly 100 to be fastened. The guide elements 32*a*, 32*b* preferably in each case have a latching tab or a latching hook at the distal end thereof. Preferably, in the mounted state, this latch contacts a receptacle 201*a*, 201*b* of the fastening element 32*a*, 32*b* so that a pair of active surfaces can be provided to transfer the expanding forces to the internal receptacle 104.

According to an advantageous further development of the invention, the receptacles 201*a*, 201*b* are configured as stop surfaces in the fastening element 32*a*, 32*b*. The locking hooks preferably engage in a positive manner in the receptacle 201*a*, 201*b* formed as an undercut.

FIG. 3*b* shows the assembly holder 101 and the guide elements 34*a*, 34*b* in a mounted position. As can be clearly seen in FIG. 3*b*, an expanding force F1, F2 is respectively transferred to the assembly holder 101 via the guide elements 34*a*, 34*b*. The expanding segments 17*a*, 17*b* in each case have a circumferential angle φa, φb of between 35° and 85°, in particular of between 50° and 70°, particularly preferably of substantially 60° of the internal receptacle 104. In the region of the expanding segments 17*a*, 17*b*, the assembly holder 101 and the assembly 102 are arranged spaced apart from each other. Outside of the expanding segments 17*a*, 17*b*, in the assembled state, the internal receptacle 104 contacts the assembly 102.

Due to drawing the assembly holder 102 apart by means of the expanding elements 15*a*, 15*b*, the internal receptacle 104 of the assembly holder 101 has a non-circular contour in the mounted state. Preferably, the contour is formed oval in segments. According to an advantageous further development of the invention, the radius R2*a*, R2*b* of the expanding segments 17*a*, 17*b* in the mounted state deviates from the radius R1 of the internal receptacle 104 to the center point.

The invention claimed is:

1. A cooling fan module (10) for a vehicle, the cooling fan module (10) having a cooler shroud (12) and an assembly module (100) fastened to the cooler shroud (12), having an elastic assembly holder (101) and an assembly (102) accommodated in the assembly holder (101), the assembly holder (101) having an internal receptacle (104) surrounding the assembly (102), wherein the cooler shroud (12) has an expanding element (15, 15*a*, 15*b*) which is configured to expand the internal receptacle (104) of the assembly holder (101), wherein the cooler shroud (12) comprises a first guide element (34*a*) and second guide element (34*b*) spaced apart from the first guide element (34*a*), wherein the guide elements (34*a*, 34*b*) in each case interact in a positive manner with a first fastening element (32*a*) and a second fastening element (32*b*) of the assembly holder (101), wherein the guide elements (34*a*, 34*b*) in each case have a first expanding element segment (15*a*) and a second expanding element segment (15*b*) of the expanding element (15), and wherein the internal receptacle (104) of the assembly holder (101) is deformed by the expanding element segments (15*a*, 15*b*) in a first expanding segment (17*a*) and a second expanding segment (17*b*).

2. The cooling fan module (10) according to claim 1, wherein the expanding element (15, 15*a*, 15*b*) spreads the assembly holder (101) in an expanding segment (17*a*, 17*b*) such that a radial gap is formed between the internal receptacle (104) of the assembly holder (101) and the assembly (102).

3. The cooling fan module (10) according to claim 1, wherein the internal receptacle (104) of the assembly holder (101) and the assembly (102) are formed spaced apart from each other in the expanding segment (17*a*, 17*b*).

4. The cooling fan module (10) according to claim 1, wherein the internal receptacle (104) substantially completely contacts the assembly (102) outside the expanding segments (17*a*, 17*b*).

5. The cooling fan module (10) according to claim 1, wherein the internal receptacle (104) has a substantially cylindrical contour prior to installation on the guide elements (34*a*, 34*b*) of the cooler shroud (12), wherein the expanding element segments (15*a*, 15*b*) are configured to draw the internal receptacle radially outward out of the cylindrical contour in the respective expanding segment (17*a*, 17*b*).

6. The cooling fan module (10) according to claim 1, wherein the first expanding element segment (15*a*) and the second expanding element segment (15*b*) in each case apply a first expanding force (F1) and a second expanding force (F2) to the assembly holder (101), wherein expanding force vectors of the expanding forces (F1, F2) are aligned opposite to each other.

7. The cooling fan module (10) according to claim 1, wherein the fastening elements (32*a*, 32*b*) of the assembly holder (102) are arranged on a radially outer side (106) of the assembly holder (102).

8. The cooling fan module (10) according to claim 1, wherein the expanding segments (17*a*, 17*b*) respectively cover a circumferential angle (φa, φb) of between 35° and 85°.

9. The cooling fan module (10) according to claim 8, wherein the expanding segments (17*a*, 17*b*) respectively cover a circumferential angle (φa, φb) of between 50° and 70°.

10. The cooling fan module (10) according to claim 9, wherein the expanding segments (17*a*, 17*b*) respectively cover a circumferential angle (φa, φb) of substantially 60°.

11. The cooling fan module (10) according to claim 1, wherein a radius (R2*a*, R2*b*) of the expanding segments (17*a*, 17*b*) in an installed state deviates from a radius (R1) of the internal receptacle (104) in an unmounted state.

12. The cooling fan module (10) according to claim 1, wherein the internal receptacle (104) has a non-circular contour after mounting on the guide elements (34*a*, 34*b*) of the cooler shroud (12).

13. The cooling fan module (10) according to claim 1, wherein the expanding element segments (15*a*, 15*b*) are configured as expanding hooks, wherein the fastening elements (32*a*, 32*b*) in each case have a receptacle (201*a*, 201*b*) for the expanding hooks.

14. The cooling fan module (10) according to claim 13, wherein the receptacle (201*a*, 201*b*) is configured as a stop surface in the respective fastening element (32*a*, 32*b*).

15. The cooling fan module (10) according to claim 1, wherein the assembly holder (101) having the fastening elements (32*a*, 32*b*) is integrally formed and/or the guide elements (34*a*, 34*b*) and the respective expanding element segment (15*a*, 15*b*) are integrally formed.

16. The cooling fan module (10) according to claim 1, wherein the guide elements (34*a*, 34*b*) are arranged inclined towards the assembly (102) on the cooler shroud (12).

17. The cooling fan module (10) according to claim 16, wherein the guide elements (34*a*, 34*b*) are arranged inclined towards the assembly (102) on the cooler shroud (12) at an expanding angle ($\alpha$) between 1° and 20° to a normal of the cooler shroud surface (204*a*, 204*b*).

18. The cooling fan module (10) according to claim 17, wherein the guide elements (34*a*, 34*b*) are arranged inclined towards the assembly (102) on the cooler shroud (12) at an expanding angle ($\alpha$) between 2° and 15° to the normal of the cooler shroud surface (204*a*, 204*b*).

19. The cooling fan module (10) according to claim 18, wherein the guide elements (34*a*, 34*b*) are arranged inclined towards the assembly (102) on the cooler shroud (12) at an expanding angle ($\alpha$) between 3° and 10° to the normal of the cooler shroud surface (204*a*, 204*b*).

20. The cooling fan module (10) according to claim 1, wherein the guide elements (32) are arranged in a radially outer edge region of the cooler shroud (12).

* * * * *